(12) United States Patent
Wang et al.

(10) Patent No.: US 9,415,379 B2
(45) Date of Patent: Aug. 16, 2016

(54) METHOD OF SYNTHESIZING TUNGSTEN CARBIDE NANORODS AND CATALYSTS FORMED THEREWITH

(71) Applicant: Nanyang Technological University, Singapore (SG)

(72) Inventors: Xin Wang, Singapore (SG); Ya Yan, Singapore (SG)

(73) Assignee: NANYANG TECHNOLOGICAL UNIVERSITY, Singapore (SG)

( * ) Notice: Subject to any disclaimer, the term of this patent is extended or adjusted under 35 U.S.C. 154(b) by 0 days.

(21) Appl. No.: 14/376,089

(22) PCT Filed: Mar. 13, 2013

(86) PCT No.: PCT/SG2013/000104
§ 371 (c)(1),
(2) Date: Jul. 31, 2014

(87) PCT Pub. No.: WO2013/137827
PCT Pub. Date: Sep. 19, 2013

(65) Prior Publication Data
US 2014/0371052 A1    Dec. 18, 2014

Related U.S. Application Data

(60) Provisional application No. 61/610,240, filed on Mar. 13, 2012.

(51) Int. Cl.
| | | |
|---|---|---|
| *C01B 31/34* | (2006.01) | |
| *B01J 27/22* | (2006.01) | |
| *B01J 23/42* | (2006.01) | |
| *B01J 37/08* | (2006.01) | |
| *B01J 37/10* | (2006.01) | |
| *B01J 37/18* | (2006.01) | |
| *B01J 37/34* | (2006.01) | |
| *B01J 23/44* | (2006.01) | |
| *B01J 23/46* | (2006.01) | |
| *B01J 23/50* | (2006.01) | |
| *B01J 35/00* | (2006.01) | |
| *B01J 35/02* | (2006.01) | |
| *B01J 35/10* | (2006.01) | |
| *B01J 37/02* | (2006.01) | |
| *B82Y 30/00* | (2011.01) | |
| *B82Y 40/00* | (2011.01) | |

(52) U.S. Cl.
CPC *B01J 27/22* (2013.01); *B01J 23/42* (2013.01); *B01J 23/44* (2013.01); *B01J 23/464* (2013.01); *B01J 23/50* (2013.01); *B01J 35/0013* (2013.01); *B01J 35/026* (2013.01); *B01J 35/1019* (2013.01); *B01J 37/0201* (2013.01); *B01J 37/084* (2013.01); *B01J 37/10* (2013.01); *B01J 37/18* (2013.01); *B01J 37/343* (2013.01); *C01B 31/34* (2013.01); *B82Y 30/00* (2013.01); *B82Y 40/00* (2013.01)

(58) Field of Classification Search
CPC ............................ C01B 31/34; B01J 27/22
USPC ........................................ 423/440; 502/177
See application file for complete search history.

(56) References Cited

FOREIGN PATENT DOCUMENTS

| | | |
|---|---|---|
| EP | 1920837 A2 | 5/2008 |
| WO | 2013137827 A1 | 9/2013 |

OTHER PUBLICATIONS

Z. Chen, D. Cummins, B. N. Reinecke, E. Clark, M. K. Sunkara and T. F. Jaramillo, Nano Letters, 2011, 11, 4168-4175.
A. Phuruangrat, D. J. Ham, S. Thongtem and J. S. Lee, Electrochemistry Communications, 2009, 11, 1740-1743.
Foreign Communication From a Related Counterpart Application, International Search Report dated May 6, 2013, International Application No. PCT/SG2013/000104 filed on Mar. 13, 2013.
Cui, X., et al., "Synthesis of Mesoporours Tungsten Carbide by an Impregnation-Compaction Route and it's NH3 Decomposition Catalytic Activity", Dalton Trans. Oct. 2008, vol. 37 No. 45.
Zheng, H., et al., Preparation and Electrocatalytic Activity of Tungsten Carbide Nanorod Arrays, J. Mater. Sci. Technol. 2007 vol. 23 No. 5.
Yan, Y., et al., "Template-Free Psuedomorphic Synthesis of Tungsten Carbide Nanorods", Small, Jul. 2012, vol. 8, No. 21, pp. 3350-3356.
Levy, R. B.; Boudart, M., Platinum-Like Behavior of Tungsten Carbide in Surface Catalysis. Science 1973, 181 (4099), 547-549.
Vidick, B.; Lemaître, J.; Leclercq, L., Control of the catalytic activity of tungsten carbides : III. Activity for ethylene hydrogenation and cyclohexane dehydrogenation. Journal of Catalysis 1986, 99 (2), 439-448.
Ledoux, M. J.; Huu, C. P.; Guille, J.; Dunlop, H., Compared activities of platinum and high specific surface area Mo2C and WC catalysts for reforming reactions: I. Catalyst activation and stabilization: Reaction of n-hexane. Journal of Catalysis 1992, 134 (2), 383-398.
Curry, K. E.; Thompson, L. T., Carbon-hydrogen bond activation over tungsten carbide catalysts. Catalysis Today 1994, 21 (1), 171-184.
Hwu, H. H.; Chen, J. G., Potential Application of Tungsten Carbides as Electrocatalysts: 4. Reactions of Methanol, Water, and Carbon Monoxide over Carbide-Modified W(110). The Journal of Physical Chemistry B 2003, 107 (9), 2029-2039.
Ribeiro, F. H.; Dalla Betta, R. A.; Boudart, M.; Baumgartner, J.; Iglesia, E., Reactions of neopentane, methylcyclohexane, and 3,3-dimethylpentane on tungsten carbides: The effect of surface oxygen on reaction pathways. Journal of Catalysis 1991, 130 (1), 86-105.
Ribeiro, F. H.; Boudart, M.; Dalla Betta, R. A.; Iglesia, E., Catalytic reactions of n-Alkanes on [beta]-W2C and WC: The effect of surface oxygen on reaction pathways. Journal of Catalysis 1991, 130 (2), 498-513.

(Continued)

*Primary Examiner* — Stuart Hendrickson (57) ABSTRACT

A method of synthesizing tungsten carbide nanorods, the method comprising: mixing tungsten oxide ($WO_3$) nanorods with a carbon source to obtain precursors; and calcining the precursors to obtain tungsten carbide nanorods, without use of any catalyst. A catalyst of metal nanostructures supported on tungsten carbide nanorods.

16 Claims, 5 Drawing Sheets

(56) References Cited

OTHER PUBLICATIONS

Weigert, E. C.; Stottlemyer, A. L.; Zellner, M. B.; Chen, J. G., Tungsten Monocarbide as Potential Replacement of Platinum for Methanol Electrooxidation. The Journal of Physical Chemistry C 2007, 111 (40), 14617-14620.

Harnisch, F.; Schroder, U.; Quaas, M.; Scholz, F., Electrocatalytic and corrosion behaviour of tungsten carbide in near-neutral pH electrolytes. Applied Catalysis B: Environmental 2009, 87 (1-2), 63-69.

Nie, M.; Shen, P. K.; Wu, M.; Wei, Z.; Meng, H., A study of oxygen reduction on improved Pt-WC/C electrocatalysts. Journal of Power Sources 2006, 162 (1), 173-176.

Santos, L.; Freitas, K.; Ticianelli, E., Electrocatalysis of oxygen reduction and hydrogen oxidation in platinum dispersed on tungsten carbide in acid medium. Journal of Solid State Electrochemistry 2007, 11 (11), 1541-1548.

Esposito, D.V.; Dobson, K.D.; McCandless, B. E.; Birkmire, R. W.; Chen, J.G., Comparative Study of Tungsten Monocarbide and Platinum as Counter Electrodes in Polysulfide-Based Photoelectrochemical Solar Cells. Journal of the Electrochemical Society 2009, 156 (8), B962-B969.

Wang, Y.; Song, S.; Maragou, V.; Shen, P. K.; Tsiakaras, P., High surface area tungsten carbide microspheres as effective Pt catalyst support for oxygen reduction reaction. Applied Catalysis B: Environmental 2009, 89 (1-2), 223-228.

Nie, M.; Shen, P. K.; Wei, Z., Nanocrystaline tungsten carbide supported Au-Pd electrocatalyst for oxygen reduction. Journal of Power Sources 2007, 167 (1), 69-73.

Meng, H.; Shen, P. K., Tungsten Carbide Nanocrystal Promoted Pt/C Electrocatalysts for Oxygen Reduction. The Journal of Physical Chemistry B 2005, 109 (48), 22705-22709.

Chhina, H.; Campbell, S.; Kesler, O., High surface area synthesis, electrochemical activity, and stability of tungsten carbide supported Pt during oxygen reduction in proton exchange membrane fuel cells. Journal of Power Sources 2008, 179 (1), 50-59.

Zhao, Z.; Fang, X.; Li, Y.; Wang, Y.; Shen, P. K.; Xie, F.; Zhang, X., The origin of the high performance of tungsten carbides/carbon nanotubes supported Pt catalysts for methanol electrooxidation. Electrochemistry Communications 2009, 11 (2), 290-293.

Chhina, H.; Campbell, S.; Kesler, O., Ex situ Evaluation of Tungsten Oxide as a Catalyst Support for PEMFCs. Journal of the Electrochemical Society 2007, 154 (6), B533-B539.

Liu, N.; Kourtakis, K.; Figueroa, J. C.; Chen, J. G., Potential application of tungsten carbides as electrocatalysts: III. Reactions of methanol, water, and hydrogen on Pt-modified C/W(111) surfaces. Journal of Catalysis 2003, 215 (2), 254-263.

Hwu, H. H.; Chen, J. G., Potential application of tungsten carbides as electrocatalysts. Journal of Vacuum Science & Technology A: Vacuum, Surfaces, and Films 2003, 21 (4), 1488-1493.

Xiao, T.; Hanif, A.; York, A. P. E.; Sloan, J.; Green, M. L. H., Study on preparation of high surface area tungsten carbides and phase transition during the carburisation. Physical Chemistry Chemical Physics 2002, 4 (14), 3522-3529.

Brady, C. D. A.; Rees, E. J.; Burstein, G. T., Electrocatalysis by nanocrystalline tungsten carbides and the effects of codeposited silver. Journal of Power Sources 2008, 179 (1), 17-26.

Welham, N. J., Formation of micronised WC from scheelite (CaWO4). Materials Science and Engineering: A 1998, 248 (1-2), 230-237.

Oxley, J. D.; Mdleleni, M. M.; Suslick, K. S., Hydrodehalogenation with sonochemically prepared Mo2C and W2C. Catalysis Today 2004, 88 (3-4), 139-151.

Zeng, D.; Hampden-Smith, M. J., Room-temperature synthesis of molybdenum and tungsten carbides, Mo2C and W2C, via chemical reduction methods. Chemistry of Materials 1992, 4 (5), 968-970.

Wanner, S.; Hilaire, L.; Wehrer, P.; Hindermann, J. P.; Maire, G., Obtaining tungsten carbides from tungsten bipyridine complexes via low temperature thermal treatment. Applied Catalysis A: General 2000, 203 (1), 55-70.

Gao, L; Kear, B. H., Synthesis of nanophase WC powder by a displacement reaction process. Nanostructured Materials 1997, 9 (1-8), 205-208.

Tsuji, M.; Hashimoto, M.; Nishizawa, Y.; Kubokawa, M.; Tsuji, T., Microwave-Assisted Synthesis of Metallic Nanostructures in Solution. Chemistry—A European Journal 2005, 11 (2), 440-452.

Liu, Z., Positive periodic solution for a neutral delay competitive system. Journal of Mathematical Analysis and Applications 2004, 293 (1), 181-189.

Sun, S.; Jaouen, F.; Dodelet, J.-P., Controlled Growth of Pt Nanowires on Carbon Nanospheres and Their Enhanced Performance as Electrocatalysts in PEM Fuel Cells. Advanced Materials 2008, 20 (20), 3900-3904.

Davis, R. J.; Derouane, E. G., A non-porous supported-platinum catalyst for aromatization of n-hexane. Nature 1991, 349 (6307), 313.

Lytle, J. C.; Denny, N. R.; Turgeon, R. T.; Stein, A., Pseudomorphic transformation of inverse opal tungsten oxide to tungsten carbide. Advanced Materials 2007, 19 (21), 3682-+.

F. Zhao, F. Harnisch, U. Schröder, F. Scholz, P. Bogdanoff and I. Herrmann, Environmental Science & Technology, 2006, 40, 5193-5199.

A. Contreras, R. Guirado and T. N. Veziroglu, International Journal of Hydrogen Energy, 2007, 32, 4635-4640.

A. Midilli and I. Dincer, International Journal of Hydrogen Energy, 2007, 32, 511-524.

W.-F. Chen, K. Sasaki, C. Ma, A. I. Frenkel, N. Marinkovic, J. T. Muckerman, Y. Zhu and R. R. Adzic, Angewandte Chemie International Edition, 2012, 51, 6131-6135.

D. J. Ham, R. Ganesan and J. S. Lee, International Journal of Hydrogen Energy, 2008, 33, 6865-6872.

T. F. Jaramillo, J. Bonde, J. Zhang, B.-L. Ooi, K. Andersson, J. Ulstrup and I. Chorkendorff, The Journal of Physical Chemistry C, 2008, 112, 17492-17498.

Y. Li, H. Wang, L. Xie, Y. Liang, G. Hong and H. Dai, Journal of the American Chemical Society, 2011, 133, 7296-7299.

H. Vrubel, D. Merki and X. Hu, Energy & Environmental Science, 2012, 5, 6136-6144.

Z. Wu, B. Fang, A. Bonakdarpour, A. Sun, D. P. Wilkinson and D. Wang, Applied Catalysis B: Environmental, 2012, 125, 59-66.

METHOD OF SYNTHESIZING TUNGSTEN CARBIDE NANORODS AND CATALYSTS FORMED THEREWITH

CROSS-REFERENCE TO RELATED APPLICATIONS

This application is a filing under 35 U.S.C. 371 as the National Stage of International Application No. PCT/SG2013/000104, filed Mar. 13, 2013, entitled "A METHOD OF SYNTHESIZING TUNGSTEN CARBIDE NANORODS AND CATALYSTS FORMED THEREWITH", which claims the benefit of and priority to U.S. Provisional Patent Application No. 61/610,240, filed Mar. 13, 2012, each of which are incorporated herein by reference in their entirety for all purposes.

FIELD OF THE INVENTION

This invention relates to a method of synthesizing tungsten carbide nanorods and catalysts formed therewith, in particular, to synthesis of high surface area tungsten carbide nanorods for catalysis/electrocatalysis applications.

BACKGROUND OF THE INVENTION

In recent years, tungsten carbide (WC) has attracted considerable attention for catalytic and electro-catalytic applications since the discovery of its Pt-like characteristics as reported by Levy and Boudart.[1] It is well known that WC has high catalytic activity for hydrogenolysis and isomerization reactions.[2-7] Tungsten carbide is also reported to exhibit certain activity for many electrochemical reactions of interest, including hydrogen oxidation,[8,9] oxygen reduction,[10,11] hydrogen evolution reaction (HER),[12] and oxidation of various organic molecules.[9] Although its electro-catalytic activity was usually not sufficient, the low cost and insensitivity to catalyst poisons such as CO make it an interesting alternative to noble metal catalyst. Other than direct use as a catalyst, tungsten carbide has also been intensively studied as a catalyst support for various reactions.[10,13-15] Particularly, its high corrosion resistance and superior electronic conductivity renders WC suitable as an electro-catalyst support for various electrochemical applications, such as fuel cells.[16-18] For example, higher catalytic activity has been reported for Pt/WC compared to Pt/C due to the synergistic effect between Pt and WC.[19,20]

Also, sustainable hydrogen production through splitting of water has attracted great scientific interest in the past decades.[34,35] By far, extensive research efforts have been made in developing advanced electrocatalysts with reduced overpotential for hydrogen evolution reaction (HER).[36-42] Typically, electrocatalytic system for hydrogen evolution incorporates noble metals such as platinum (Pt) because of their high electroactivity. However, the high cost and scarcity of noble metals are serious barriers for their wide use in the water electrolysis.[43]

Conventionally, several routes have been adopted to synthesize WC powder, including direct carburization of tungsten or W-containing compounds at high temperature (typically, higher than 1400° C.), solid state metathesis and mechanical milling. However, these approaches often lead to low specific surface area, large particle size and poor morphology control. Commercial WC and WC synthesized by reported methods are normally lower than 10 m² g⁻¹ and the maximum value reported is ~100 m² g⁻¹.[11,21-29] To synthesize nanostructured WC with high surface area and controlled morphology still remains a challenge.[30,31] Furthermore, the ability to control specific nanostructure is critical for the tuning of its physical and chemical property, especially when WC is to be used as catalyst support.

SUMMARY OF INVENTION

Among various nanostructures, nanorods of WC is of particular interest due to their unique properties and are the main objective of this work. Pseudomorphic transformation has been investigated for the synthesis of three-dimensionally ordered macroporous tungsten carbide from the tungsten oxide.[32]

The invention is a method to synthesize a unique nanorod-structured mesoporous tungsten carbide (denoted as m-NRTC) material with high specific surface area of 198 m² g⁻¹ by pseudomorphic transformation of chemically synthesized $WO_3$ nanorods. This method combines a size-controlled hydrothermal reaction and a thermal treatment in the presence of chemically synthesized $WO_3$ and glucose. A new electro-catalyst composed of Pt nanoparticles supported on m-NRTC is also synthesized and demonstrated using methanol electro-oxidation and CO stripping. The new electro-catalyst demonstrates higher electro-catalytic activity for methanol electro-oxidation, better tolerance to CO poisoning and superior hydrogen evolution reaction than a Pt/C catalyst. This work provides a simple and economic thought to synthesize nanorod-structured WC materials by preparing oxide precursors with the desired external morphology, thus leading to more applications of those materials in the related reaction systems.

The present invention thus significantly improves the utilization and the catalytic efficiency of WC materials with smaller particles size and controlled morphology by pseudomorphic transformation of chemically synthesized $WO_3$ nanorods. Also, the synthesis of m-NRTC materials with high uniformity, high specific surface areas and nano-size as specified in the present invention is important for developing it as the electrocatalysts as well as catalyst support that exhibit a synergistic effect with Pt.

According to a first aspect, there is provided a method of synthesizing tungsten carbide nanorods, the method comprising: mixing tungsten oxide ($WO_3$) nanorods with a carbon source to obtain precursors; and calcining the precursors to obtain tungsten carbide nanorods, without use of any catalyst.

The carbon source may comprise glucose and the mixing may comprise forming a mixture of tungsten oxide ($WO_3$) nanorods with the glucose, the method further comprising hydrothermally treating the mixture and evaporating the hydrothermally treated mixture prior to the calcining.

The hydrothermally treating may be performed in an autoclave at about 110° C. to 300° C.

The hydrothermally treating may be performed for about 4 to 12 hours.

The calcining may comprise heating the precursors at about 600° C. to 1000° C. under a flow of gas comprising at least one of: hydrogen and argon.

The calcining may be performed for about 1 to 6 hours.

The gas may comprise hydrogen and argon having a respective volume ratio of 1:3.

The flow of gas may be at a rate of about 300 mL/min.

The molar ratio of tungsten to carbon in the mixture may be 0.078.

The precursors may comprise carbon-coated tungsten oxide ($WO_3$) nanorods.

Alternatively, the carbon source may comprise methane and the mixing may comprise heating the tungsten oxide ($WO_3$) nanorods in the presence of the methane and hydrogen in a furnace.

According to a second aspect, there is provided tungsten carbide nanorods synthesized according to the method of the first aspect.

The tungsten carbide nanorods may have a mesoporous structure.

The tungsten carbide nanorods may have a specific surface area greater than or equal to 170 $m^2g^{-1}$.

According to a third aspect, there is provided a method of synthesizing a catalyst of metal nanostructures supported on tungsten carbide nanorods, the method comprising: mixing tungsten oxide ($WO_3$) nanorods and a carbon source to obtain precursors; calcining the precursors to obtain tungsten carbide nanorods, without use of any catalyst; and depositing metal nanostructures on the tungsten carbide nanorods to form the catalyst.

The metal nanostructures may comprise platinum nanoparticles and the depositing may comprise: suspending the tungsten carbide nanorods in ethylene glycol to form a solution; adding hexachloroplatinic acid to the solution; and drying a solid in the solution to form the catalyst.

Suspending the tungsten carbide nanorods in ethylene glycol may comprise ultrasonic stirring.

The hexachloroplatinic acid may be added dropwise to the solution to reach a concentration of 4.6 mg platinum per milliliter of ethylene glycol.

The method of the third aspect may further comprise increasing alkalinity comprises adding sodium hydroxide to adjust the pH of the solution to above 13.

The method of the third aspect may further comprise filtering and washing the solid prior to the drying.

The drying may be performed in a vacuum oven at about 25° C. to 100° C.

The method of the third aspect may further comprise increasing alkalinity of the solution prior to the drying.

The method of the third aspect may further comprise heating the solution to reduce platinum in the solution prior to the drying.

The heating may be at about 100° C. to 200° C.

The method of the third aspect may further comprise promoting with a sedimentation promoter adsorption of suspended platinum nanoparticles onto the tungsten carbide nanorods prior to the drying.

Alternatively, the metal nanostructures may comprise at least one selected from the group consisting: of Pd, Ag and Rh.

According to a fourth aspect, there is provided a catalyst of metal nanostructures supported on tungsten carbide nanorods.

The metal nanostructures may comprise platinum nanoparticles and wherein the catalyst is synthesized according to the method of the third aspect.

The catalyst may have a mesoporous nanorod structure comprising mesopores among aggregated nanorods.

The catalyst may have a higher electro-catalytic activity for methanol electro-oxidation than a catalyst of platinum nanoparticles on a carbon support.

The catalyst may have a greater tolerance to carbon monoxide poisoning than a catalyst of platinum nanoparticles on a carbon support.

BRIEF DESCRIPTION OF FIGURES

In order that the invention may be fully understood and readily put into practical effect there shall now be described by way of non-limitative example only exemplary embodiments of the present invention, the description being with reference to the accompanying illustrative drawings.

DETAILED DESCRIPTION

Exemplary embodiments of the invention will be described with reference to FIGS. 1 to 10 below.

Synthesis of $WO_3$ Nanorods

In a typical or exemplary method of synthesis, 0.6597 g of $Na_2WO_4 \cdot 2H_2O$ (Sigma-Aldrich) and 0.5286 g of $(NH_4)_2SO_4$ (Sigma-Aldrich) were dissolved in 15 ml de-ionized water, then 3M HCl (Sigma-Aldrich) aqueous solution was added to adjust the pH value to 2.0.

Afterwards, the solution obtained was transferred into a Teflon-lined stainless autoclave where the reaction was maintained at 180° C. for 8 h. Then the precipitate was filtered, washed sequentially with water and ethanol, and dried at 60° C. to obtain as-prepared $WO_3$ nanorods 10.

Synthesis of m-NRTC and m-WC

Figure 1:
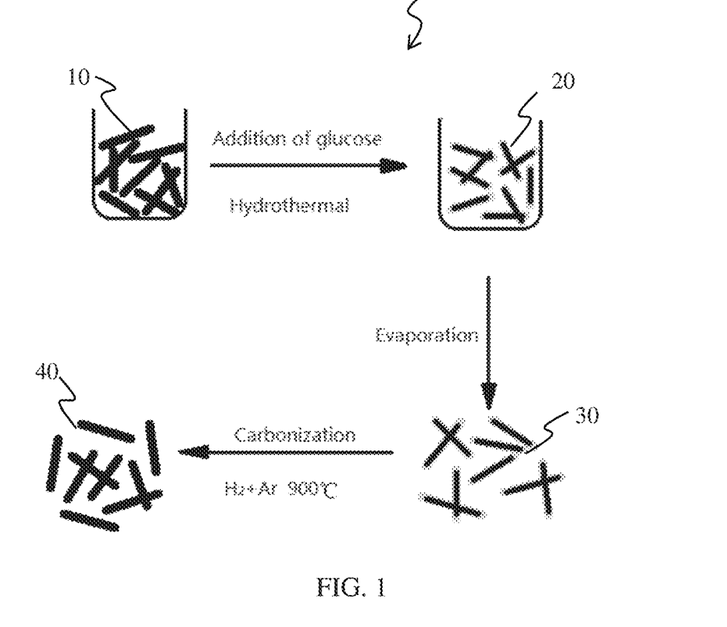
FIG. 1 is a schematic illustration of formation of m-NRTC.

As shown in FIG. 1, in a typical or exemplary synthesis procedure of m-NRTC 40, a proper amount of the as-prepared $WO_3$ nanorods 10 and glucose (Sigma-Aldrich) (the molar ratios of W:C=0.078) were dissolved in 15 mL distilled-deionized water and vigorously stirred for 20 min. The mixture was hydrothermally treated in a sealed Teflon lined stainless steel autoclave at a temperature of between 110° C. to 300° C. (e.g. 180° C.), for about 4 to 12 hours (e.g. 8 hours) to obtain carbon-coated $WO_3$ nanorods 20 that subsequently underwent evaporation to form m-NRTC precursors 30 of the m-NRTC. The as-prepared precursors 30 were calcined at about 600° C. to 1000° C. (e.g. 900° C.) under a flow of $H_2$/Ar ($V_{H_2}/V_{Ar}$=1:3, 300 mL/min) for 3 hours in a tube furnace to finally form m-NRTC 40.

Since no catalysts such as Mg have been used in the above synthesis, no by-products such as $MgWO_4$ or any precursors of $WO_3$ remain. The final product arising from the synthesis method 100 of the present invention is only WC nanorods with a very thin graphite carbon film of about 1 nm thickness, or m-NRTC.

Instead of using glucose which acts as a solid carbon source in the method of synthesis described above, a gaseous source of carbon such as methane ($CH_4$) may be used to synthesize the tungsten carbide nanorods. Where methane is used, the obtained tungsten carbide nanorods is mesoporous WC (m-WC) with high purity, that is, no obvious carbon detected by currently available devices.

In an exemplary method of synthesis of m-WC using methane as the carbon source, a certain amount (e.g. 50 to 80 mg) of the as-prepared $WO_3$ nanorods is transferred into a tube furnace for reduction-carburization. The whole system should be airproofed and an inert gas such as argon may be used to completely remove any ambient air before heating the tube furnace. Subsequently, the argon is switched off and replaced with a mixture of $CH_4$ at an exemplary flow rate of 20 mL min$^{-1}$ and $H_2$ at an exemplary flow rate of 80 mL min$^{-1}$. In the meantime, the tube furnace is heated to 600° C. with a ramp rate of 5° C. min$^{-1}$ to obtain precursors of the m-WC. Subsequently, the tube furnace is heated to 800° C. at a rate of 2° C. min$^{-1}$ and kept at this temperature for 3 h with the same carburizing agent comprising the methane and hydrogen gas mixture described above, thereby calcining the precursors of the m-WC. It is also important to appreciate that in this embodiment, the calcining is performed for about between 1 to 6 hours. When the tube furnace has cooled down to a temperature of 700° C., the carburizing agent is switched off and the inert gas such as argon is again switched on. The tube furnace is further cooled down to room temperature to obtain the m-WC prepared using methane as the gaseous carbon source.

Preparation of Pt/m-NRTC and Pt/C Catalysts

Pt/m-NRTC and Pt/C catalysts were synthesized by an Ethylene Glycol (EG) method. These catalysts comprise Pt nanoparticles on either m-NRTC or carbon support. Briefly, 40 mg of m-NRTC or XC-72 carbon powder (Gashub) were suspended in 10 mL of ethylene glycol solution (Sigma-Aldrich) and stirred with ultrasonic treatment for 30 min; 2.2 mL of hexachloroplatinic acid (Sigma-Aldrich) EG solution (4.6 mg Pt/mL EG) was added to the solution dropwise also under mechanically stirred conditions for 3 h. NaOH (Fluka) (2 M in EG solution) was added to adjust the pH of the solution to above 13, and then the solution was heated at about 100° C. to 200° C. (e.g. 140° C.) for 3 h to ensure that Pt was completely reduced. Thereafter, in order to promote the adsorption of suspended Pt nanoparticles onto the m-NRTC or carbon support, hydrochloric acid was adopted as the sedimentation promoter. The resulting black solid sample was filtered, washed and dried at about 25° C. to 100° C. (e.g. 60° C.) overnight in a vacuum oven.

Characterization and Electrochemical Measurements

X-Ray Diffraction (XRD) Characterization

Figure 2:
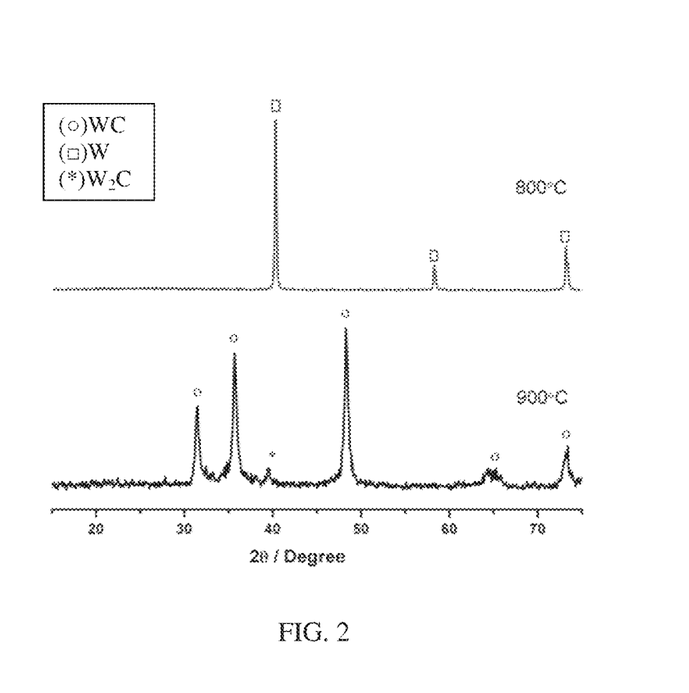
FIG. 2 shows XRD patterns of m-NRTC samples synthesized at two different temperatures 800° C. and 900° C. with molar ration of $WO_3$ to glucose of 0.078 with the reaction time of 3 h.

X-ray diffraction was used to study the structure of the obtained samples. As shown in FIG. 2, at a constant molar ratio (0.078) of $WO_3$ to glucose and reaction time (3 h), the temperature plays an important role. With the increasing of the reaction temperature, a phase transition was observed from W to WC as shown in FIG. 2. Based on this result, the optimal reaction temperature of 900° C. was determined and used to prepare WC for further characterization and measurements.

FESEM and TEM Characterization

Figure 3:
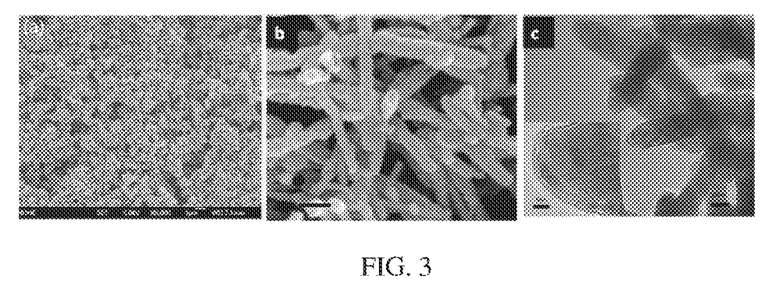
FIGS. 3a, 3b and 3c are FESEM and TEM images of m-NRTC.

The morphology of m-NRTC was studied by a field emission scanning electron microscopy (FESEM, JEOL JSM 6700F). The size and morphology of Pt/m-NRTC and Pt/C catalysts were investigated by JEOL 3010 transmission electron microscope. It can be seen in FIG. 3 that the m-NRTC obtained with chemically synthesized $WO_3$ nanorods at the optimized temperature shows an interesting mesoporous nanorod-structure (lengths over 300 nm to 1.0 um diameter from 50 to 70 nm), as can be seen in FIGS. 3b and 3c, with mesopores among the aggregated nanorods, as can be seen in FIG. 3a. The synthesized NRTC powder almost kept the morphology of the as prepared WO3 precursor on a sub-100 nm length scale. From a distance the products show a number of large irregular mesoporous particles in FIG. 3a. At close observation, those irregular particles consist of small and uniformed nanorods as can be seen in FIGS. 3b and 3c because of the aggregation.

Figure 4:
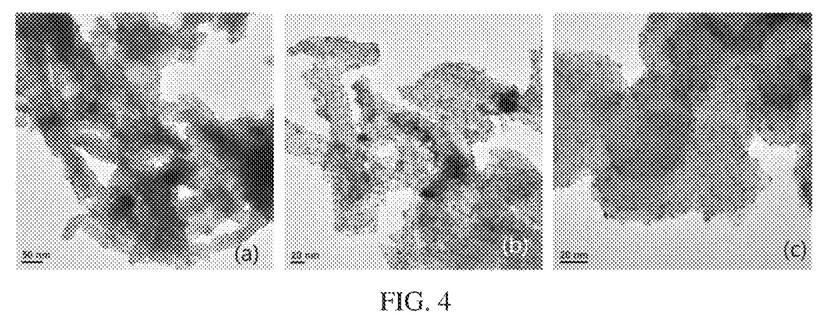
FIGS. 4a, 4b and 4c ar TEM images of as prepared Pt/m-NRTC and Pt/C catalysts.

It is found from the TEM images in FIG. 4 that the Pt nanoparticles can be uniformly dispersed on the surface of m-NCTC with an average particle size of 4 nm.

Liquid Nitrogen Adsorption/Desorption Characterization

Figure 5:
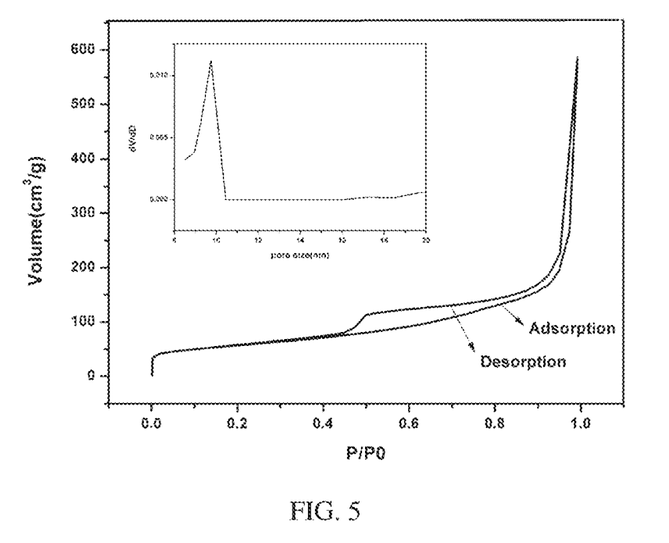
FIG. 5 shows nitrogen adsorption/desorption isotherms of m-NRTC with inset being a pore size distribution curve.
Figure 6:
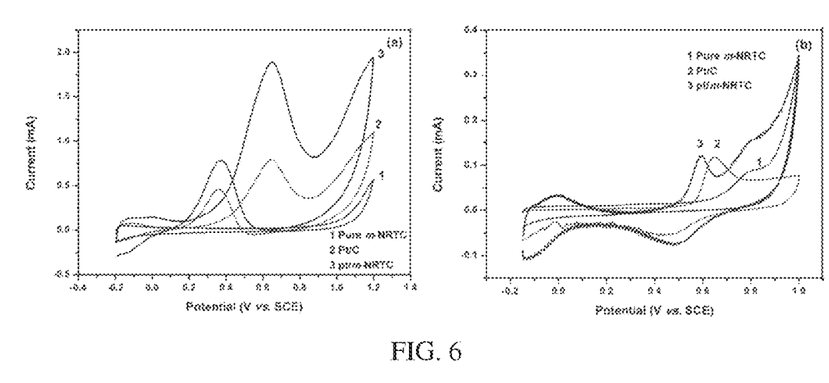
FIG. 6a shows cyclic voltagrammograms of methanol oxidation on m-NRTC, Pt/C and Pt/m-NRTC in 0.5 mol $L^{-1}$ $H_2SO_4$+1 mol $L^{-1}$ $CH_3OH$ solution, scan rate: 50 mV s-1.
FIG. 6b shows CO-stripping results on m-NRTC, Pt/C and Pt/m-NRTC in a 0.5 mol $L^{-1}H_2SO_4$ aqueous solution, scan rate: 15 $mVs^{-1}$.

The BET specific surface area and pore size distribution of the m-NRTC was measured in Autolab-6B (Quantachrome Instruments) using the liquid nitrogen adsorption method. As shown in FIG. 5, nitrogen adsorption/desorption isotherms with a distinct hysteretic loop at the relative pressure of P/P0 ranging from 0.5 to 0.9 are identified as Type IV characteristic of mesoporous materials. The sample has a BET surface area of 198 m$^2$ g$^{-1}$ with a total pore volume of 0.30 cm$^3$ g$^{-1}$, exhibiting a high specific surface area in contrast to less than 20 m$^2$ g$^{-1}$ for commercial WC products and those synthesized by other methods. The pore size distribution was investigated by the Barrett-Joyner-Halenda (BJH) method. The average pore size was about 5.9 nm in m-NRTC (inset of FIG. 5).

Electrochemical Measurements

Cyclic voltagrammograms of methanol oxidation on m-NRTC, Pt/C and Pt/m-NRTC were measured in nitrogen purged 0.5 mol L$^{-1}$ $H_2SO_4$+1 mol L$^{-1}$ $CH_3OH$ solution as shown in FIG. 6a; this represents the half-cell anode reaction of DMFC. The main feature in the CV between 0.4 V and 0.9V represents oxidation/reduction of methanol ($CH_3OH + H_2O \rightarrow CO_2 + 6H^+ + 6e^-$). The obtained CV curve (curve 3 of FIG. 6a) exhibits very prominent characteristic peaks for the methanol oxidation. In comparison, CV curves of the methanol oxidation for carbon supported Pt catalyst (curve 2 of FIG. 6a) and m-NRTC (curve 1 of FIG. 6a) were measured in the same electrolyte used for Pt/m-NRTC. The results clearly indicate that m-NRTC has no characteristic peaks of methanol oxidation and Pt/C has a significantly lower electro-catalytic peak current than Pt/m-NRTC. The main reason for this important improvement on the Pt catalyst is that m-NRTC as the support material could significantly reduce the unit loading amount to achieve the same performance as the conventional Pt/C. As is known, a porous electrode has high internal surface area for high electrochemical rates per apparent unit surface area of electrode. However, its internal area generally cannot be completely utilized at high current densities due to the difficult mass transfer and ohmic polarization in the internal pores that is simply dependant on the pore structure. Based on the porous electrode theory, a higher peak current produced by Pt/m-NCTC possibly indicates that the nanorod structure has much higher utilization efficiency than carbon pore structure although the carbon has higher specific surface area. The nanorod structure very likely ascribes to its higher electro-activity as the mesoporous particles composed of aggregated WC nanorods could result in some interstices among the aggregated nanorod domain. This kind of microstructure allows sufficient reactant molecule to be intercalated into the WC nanorods.

As shown in FIG. 6b, the CO-stripping results on m-NRTC, Pt/C and Pt/m-NRTC in a 0.5 mol L$^{-1}$ H$_2$SO$_4$ aqueous solution, it is shown that the more active Pt/m-NRTC gave smaller CO oxidation. The reason could be the presence of WC reduces the adsorption of CO on the electro-catalyst. Meanwhile, it also can be seen from FIG. 6b that CO oxidation potential for Pt/m-NRTC is 0.58 V vs. SCE, which is over 100 mV more negative than that of Pt/C (FIG. 6b). This demonstrates the improved CO electro-oxidation activity of the Pt/m-NRTC catalyst for the CO formed during the reaction process could be oxidized more easily at a lower potential on Pt/m-NRTC, thus improving the resistance to CO poisoning on the Pt based catalyst. This is an important point as it suggests that CO electro-oxidation activity can be improved by replacing the carbon support with WC, which is much cheaper than Ru. It is also observed that the pure m-NRTC is inactive for the CO oxidation as shown in FIG. 6b.

Figure 7:
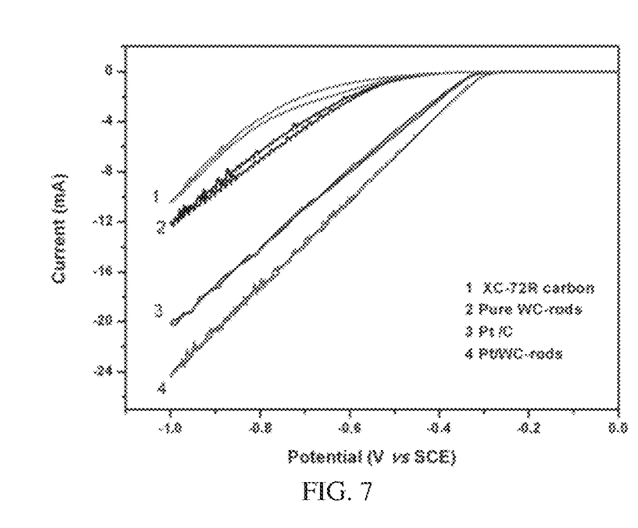
FIG. 7 shows cyclic voltammograms hydrogen evolution reaction on WC nanorods, Pt/C and Pt/WC-rods in 100 mM $H_2SO_4$, scan rate: 5 $mVs^{-1}$.

The potential application of this material for hydrogen evolution reaction under acidic condition was also examined and compared to Pt/C (FIG. 7). FIG. 7 clearly shows that WC nanorods itself shows certain activity towards hydrogen evolution reaction, which is slightly higher than Vulcan XC-72 carbon black. After the deposition of Pt nanoparticles, Pt/WC-rods again produces higher cathodic current of hydrogen evolution compared to Pt/C. Similar trends of catalytic activities of tungsten carbide supported Pt catalysts have been reported. Other than the intrinsic activity due to WC nanorods, a favorable interaction between tungsten carbides and Pt has been proposed for the observed high current density. This demonstrates the double role of nanostructured WC rods that works not only as the electrocatalyst but also as catalyst support.

Comparison of Pt/WC-Nanorod Catalyst with Pt/MWCNT Catalyst

20% Pt/WC-nanorod catalyst were compared with 20% Pt/MWCNT catalyst in mainly two aspects, i.e. active surface area loss and HER stability. These catalysts comprise Pt nanoparticles on a support of either WC-nanorods or multi-walled carbon nanotubes (MWCNT). The results are summarized in Table 1 below.

Figure 8:
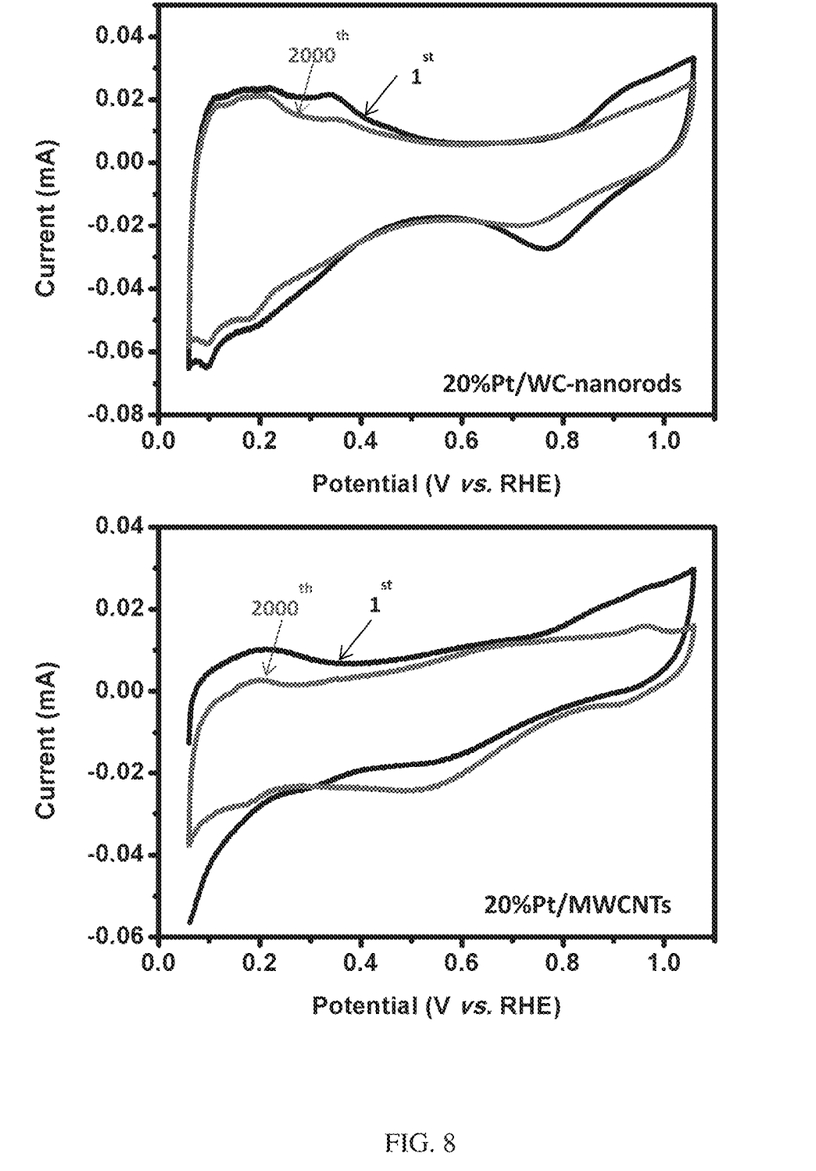
FIG. 8 shows cyclic voltammograms of Pt supported on WC-nanorods and MWCNTs before and after potential sweep for 2000 cycles in 0.5 M $H_2SO_4$.
Figure 9:
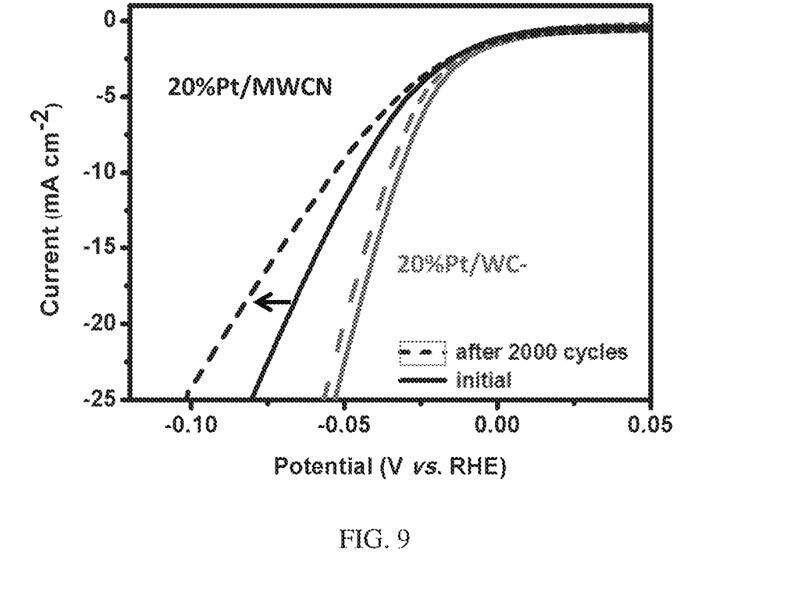
FIG. 9 shows polarization curves of Pt catalysts supported on WC-nanorods and MWCNTs before and after potential sweep for 2000 cycles in 0.5 M $H_2SO_4$.

For active surface area loss [a], the data was collected from hydrogen adsorption/desorption peaks between 0.04 and 0.4 V as shown in FIG. 8. Durability [b] of the catalysts for HER is calculated from the activity remains after 2000 cycles at −0.05V from FIG. 9. The difference will be even bigger if lower potential was used.

TABLE 1

| Catalysts | Active surface area loss [a] | Stability for HER [b] |
|---|---|---|
| Pt/WC-nanorods | 22.6% | 90.0% |
| Pt/MWCNTs | 76.3% | 71.9% |

From the results shown in Table 1, since similar Pt nanoparticles were used while varying only the support between WC-nanorods and MWCNT, it can be concluded that the observed activity difference is basically due to the effect of the support. The catalyst using WC-nanorod support show a significantly greater stability for HER than the catalyst using MWCNT support, while seeing significantly less active surface area loss.

Influence of pH on the Performance of MECs

The microbial electrolysis cell (MEC) cathode pH influences the performance of a typical MEC, which depends on MEC design. In MECs without a membrane, HER catalysts typically work around neutral pH (i.e. wastewater pH). Around neutral pH, there is a low concentration of H$^+$ and OH$^-$ and therefore, the HER is easily transport limited, which results in a considerable concentration overpotential. Buffers can overcome this transport limitation, but this strongly depends on pH, buffer pKa and concentration, current density, and hydrodynamic conditions. In MECs with a membrane, the transport of cations other than protons through the membrane causes an increased catholyte pH, and thus HER catalysts typically work at mild alkaline pH (pH>12). At alkaline pH, the HER is not mass transport limited, and thus no buffer is required, but the MEC suffers from voltage losses that arise from the pH gradient between anode and cathode. As the performance of various catalysts under typical cathode conditions (e.g. pH) is relevant, thus, choosing the right HER catalysts for MECs is another challenge which cannot be ignored.

Figure 10:
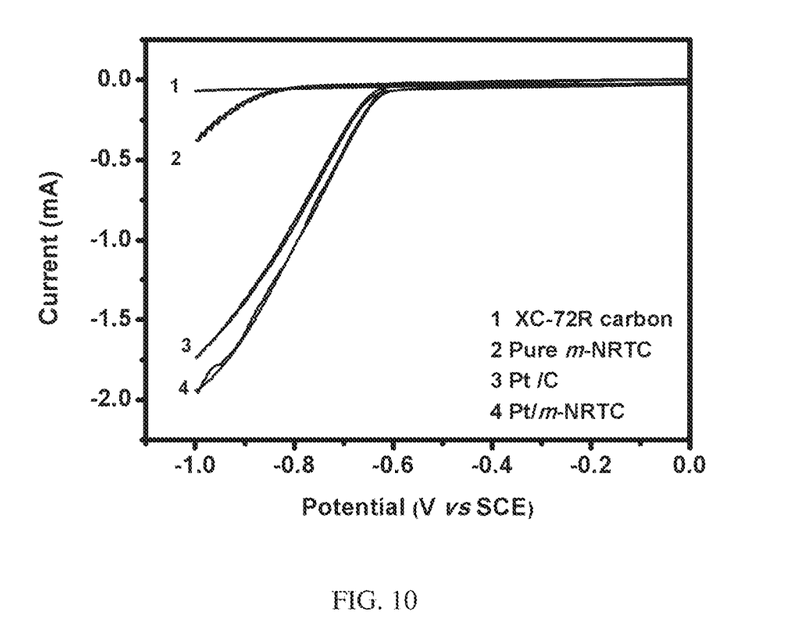
FIG. 10 shows cyclic voltammograms of hydrogen evolution reaction on WC nanorods, Pt/C and Pt/WC-rods in 100 mM pH 7, phosphate buffer, scan rate: 5 mV $s^{-1}$.

Based on the above information, WC nanorods-based catalysts have been measured to check their hydrogen evolution activity in a neutral pH environment. The data collected is shown in FIG. 10 which illustrates the hydrogen evolution behavior of Pt supported on m-NRTC, in comparison to pure m-NRTC, and Pt supported on XC-72 carbon at neutral pH. By comparison, the performance of all the materials studied is considerably lower than when under acidic conditions. This result has been expected and reported for the cathode oxygen reduction under microbial fuel cell condition[33]. However, when compared to the acidic conditions, the synergistic effect of m-NRTC with Pt is much more significant, the current value of HER reached 6.3 times that of pure m-NRTC at the same reaction condition, and is slightly higher than that of Pt/C. It may thus be speculated that the kinetics of hydrogen evolution reaction at neutral pH is less hampered using Pt supported on m-NRTC.

Applications

As the global supply of fossil fuels predictably diminishes, fuel cells (eg. PEMFC and DEMFC) have aroused great interest as clean and efficient power generation. While there exist many types of fuel cells each requiring different electrocatalysts and fuels, systems involving the oxidation of methanol to obtain hydrogen fuel or electrons appear to exhibit potential advantages over others. Currently, the electrocatalyst of choice for the DMFC system is the bimetallic system of Pt/Ru; however, the Pt/Ru system is disadvantageous in terms of its prohibitively high costs and its susceptibility to be poisoned by CO. Then tungsten carbide (WC) have become a highly potential material and been studied since its reported Pt-like characteristics. The objective of this present invention is to significantly improve the utilization and the catalytic efficiency of WC materials with smaller particles size and controlled morphology by pseudomorphic transformation of chemically synthesized WO$_3$ nanorods. Also, the synthesis of m-NRTC materials with high uniformity, high specific surface areas and nano-size as specified in the present invention is important for developing it as the electrocatalysts as well as catalyst support that exhibit a synergistic effect with Pt.

In conclusion, described above is a method to synthesize a unique nanorod-structured mesoporous tungsten carbide (denotes as m-NRTC) with high specific surface areas in the presence of chemically synthesized WO$_3$ nanorods and glucose, which were used as tungsten source and carbon source, respectively. In this method, novel carbon coated WO$_3$ nanorods served as the precursors. This way of introducing carbon within tungstic oxide maximizes the reaction rate between the reactants by improving the contact area between the WO$_3$ and carbon and providing a better distribution of carbon within WO$_3$, the carbothermal reaction typically proceeds through reduction to W via the formation of owner oxides of tungsten, followed by carburization into WC.

The phase transition can be demonstrated according to the following steps:

$$WO_3 \rightarrow W \rightarrow W_2C \rightarrow WC$$

The typical X-ray diffraction (XRD) patterns of the as-prepared m-NRTC sample show that at the optical conditions (molar ratio of $WO_3$ to glucose 0.078, reaction time 3 h and temperature 900° C.), the obtained products is a pure phase of WC. FESEM results show that the obtained m-NRTC shows an interesting mesoporous nanorod-structure (lengths over 300 nm to 1.0 um diameter from 50 to 70 nm.) with mesopores among the aggregated nanorods. The synthesized NRTC powder almost kept the morphology of the as prepared $WO_3$ precursor on a sub-100 nm length scale. The Brunauer-Emmett-Teller (BET) surface area measurement confirms the sample has a much high BET surface area of 198 $m^2$ $g^{-1}$ with a total pore volume of 0.30 $cm^3$ $g^{-1}$. The electrochemically characterization of Pt supported on m-NRTC (Pt/m-NRTC) demonstrates larger apparent electro-catalytic current, higher electro-catalytic activity for electrochemical oxidation of methanol and better resistance to CO poisoning than a Pt/C catalyst.

In contrast to the less than 20 $m^2$ $g^{-1}$ for commercial WC products and those synthesized by other methods, the m-NRTC synthesized according to the present invention has a high specific surface area of 198 $m^2$ $g^{-1}$, or at least 170 $m^2$ $g^{-1}$. This high surface area and uniform nanorod-structure of the synthesized m-NRTC makes it possible for it to be used as a catalyst or o catalytic support in proton exchange membrane fuel cells and direct methanol fuel cells.

The as-prepared electro-catalyst composed of Pt nanoparticles supported on m-NRTC demonstrates higher electro-catalytic activity for methanol electro-oxidation, better tolerance to CO poisoning and superior performance for the cathodic electrocatalytic hydrogen evolution than a Pt/C catalyst.

As an extension, this work provides a simple and economic thought to synthesize nanorod-structured WC materials by preparing precursors with the desired external morphology, thus leading to more applications of those materials in the related reaction systems.

Whilst there has been described in the foregoing description exemplary embodiments of the present invention, it will be understood by those skilled in the technology concerned that many variations in details of design, construction and/or operation may be made without departing from the present invention. For example, other metal nanostructures such as nanoparticles of Pd, Ag, Rh may be deposited on the synthesized nanorod-structured WC materials for other catalysis applications.

REFERENCES

1. Levy, R. B.; Boudart, M., Platinum-Like Behavior of Tungsten Carbide in Surface Catalysis. *Science* 1973, 181 (4099), 547-549.
2. Vidick, B.; Lemaître, J.; Leclercq, L., Control of the catalytic activity of tungsten carbides: III. Activity for ethylene hydrogenation and cyclohexane dehydrogenation. *Journal of Catalysis* 1986, 99 (2), 439-448.
3. Ledoux, M. J.; Huu, C. P.; Guille, J.; Dunlop, H., Compared activities of platinum and high specific surface area Mo2C and WC catalysts for reforming reactions: I. Catalyst activation and stabilization: Reaction of n-hexane. *Journal of Catalysis* 1992, 134 (2), 383-398.
4. Curry, K. E.; Thompson, L. T., Carbon-hydrogen bond activation over tungsten carbide catalysts. *Catalysis Today* 1994, 21 (1), 171-184.
5. Hwu, H. H.; Chen, J. G., Potential Application of Tungsten Carbides as Electrocatalysts: 4. Reactions of Methanol, Water, and Carbon Monoxide over Carbide-Modified W (110). *The Journal of Physical Chemistry B* 2003, 107 (9), 2029-2039.
6. Ribeiro, F. H.; Dalla Betta, R. A.; Boudart, M.; Baumgartner, J.; Iglesia, E., Reactions of neopentane, methylcyclohexane, and 3,3-dimethylpentane on tungsten carbides: The effect of surface oxygen on reaction pathways. *Journal of Catalysis* 1991, 130 (1), 86-105.
7. Ribeiro, F. H.; Boudart, M.; Dalla Betta, R. A.; Iglesia, E., Catalytic reactions of n-Alkanes on [beta]-W2C and WC: The effect of surface oxygen on reaction pathways. *Journal of Catalysis* 1991, 130 (2), 498-513.
8. Weigert, E. C.; Stottlemyer, A. L.; Zellner, M. B.; Chen, J. G., Tungsten Monocarbide as Potential Replacement of Platinum for Methanol Electrooxidation. *The Journal of Physical Chemistry C* 2007, 111(40), 14617-14620.
9. Harnisch, F.; Schröder, U.; Quaas, M.; Scholz, F., Electrocatalytic and corrosion behaviour of tungsten carbide in near-neutral pH electrolytes. *Applied Catalysis B: Environmental* 2009, 87 (1-2), 63-69.
10. Nie, M.; Shen, P. K.; Wu, M.; Wei, Z.; Meng, H., A study of oxygen reduction on improved Pt—WC/C electrocatalysts. *Journal of Power Sources* 2006, 162 (1), 173-176.
11. Santos, L.; Freitas, K.; Ticianelli, E., Electrocatalysis of oxygen reduction and hydrogen oxidation in platinum dispersed on tungsten carbide in acid medium. *Journal of Solid State Electrochemistry* 2007, 11 (11), 1541-1548.
12. Esposito, D. V.; Dobson, K. D.; McCandless, B. E.; Birkmire, R. W.; Chen, J. G., Comparative Study of Tungsten Monocarbide and Platinum as Counter Electrodes in Polysulfide-Based Photoelectrochemical Solar Cells. *Journal of The Electrochemical Society* 2009, 156 (8), B962-B969.
13. Wang, Y.; Song, S.; Maragou, V.; Shen, P. K.; Tsiakaras, P., High surface area tungsten carbide microspheres as effective Pt catalyst support for oxygen reduction reaction. *Applied Catalysis B: Environmental* 2009, 89 (1-2), 223-228.
14. Nie, M.; Shen, P. K.; Wei, Z., Nanocrystalline tungsten carbide supported Au—Pd electrocatalyst for oxygen reduction. *Journal of Power Sources* 2007, 167 (1), 69-73.
15. Meng, H.; Shen, P. K., Tungsten Carbide Nanocrystal Promoted Pt/C Electrocatalysts for Oxygen Reduction. *The Journal of Physical Chemistry B* 2005, 109 (48), 22705-22709.
16. Chhina, H.; Campbell, S.; Kesler, O., High surface area synthesis, electrochemical activity, and stability of tungsten carbide supported Pt during oxygen reduction in proton exchange membrane fuel cells. *Journal of Power Sources* 2008, 179 (1), 50-59.
17. Zhao, Z.; Fang, X.; Li, Y.; Wang, Y.; Shen, P. K.; Xie, F.; Zhang, X., The origin of the high performance of tungsten carbides/carbon nanotubes supported Pt catalysts for methanol electrooxidation. *Electrochemistry Communications* 2009, 11 (2), 290-293.
18. Chhina, H.; Campbell, S.; Kesler, O., Ex situ Evaluation of Tungsten Oxide as a Catalyst Support for PEMFCs. *Journal of The Electrochemical Society* 2007, 154 (6), B533-B539.
19. Liu, N.; Kourtakis, K.; Figueroa, J. C.; Chen, J. G., Potential application of tungsten carbides as electrocatalysts: III.

Reactions of methanol, water, and hydrogen on Pt-modified C/W (111) surfaces. *Journal of Catalysis* 2003, 215 (2), 254-263.
20. Hwu, H. H.; Chen, J. G., Potential application of tungsten carbides as electrocatalysts. *Journal of Vacuum Science & Technology A: Vacuum, Surfaces, and Films* 2003, 21 (4), 1488-1493.
21. Xiao, T.; Hanif, A.; York, A. P. E.; Sloan, J.; Green, M. L. H., Study on preparation of high surface area tungsten carbides and phase transition during the carburisation. *Physical Chemistry Chemical Physics* 2002, 4 (14), 3522-3529.
22. Brady, C. D. A.; Rees, E. J.; Burstein, G. T., Electrocatalysis by nanocrystalline tungsten carbides and the effects of codeposited silver. *Journal of Power Sources* 2008, 179 (1), 17-26.
23. Welham, N. J., Formation of micronised WC from scheelite (CaWO4). *Materials Science and Engineering: A* 1998, 248 (1-2), 230-237.
24. Oxley, J. D.; Mdleleni, M. M.; Suslick, K. S., Hydrodehalogenation with sonochemically prepared Mo2C and W2C. *Catalysis Today* 2004, 88 (3-4), 139-151.
25. Zeng, D.; Hampden-Smith, M. J., Room-temperature synthesis of molybdenum and tungsten carbides, Mo2C and W2C, via chemical reduction methods. *Chemistry of Materials* 1992, 4 (5), 968-970.
26. Wanner, S.; Hilaire, L.; Wehrer, P.; Hindermann, J. P.; Maire, G., Obtaining tungsten carbides from tungsten bipyridine complexes via low temperature thermal treatment. *Applied Catalysis A: General* 2000, 203 (1), 55-70.
27. Gao, L.; Kear, B. H., Synthesis of nanophase WC powder by a displacement reaction process. *Nanostructured Materials* 1997, 9 (1-8), 205-208.
28. Tsuji, M.; Hashimoto, M.; Nishizawa, Y.; Kubokawa, M.; Tsuji, T., Microwave-Assisted Synthesis of Metallic Nanostructures in Solution. *Chemistry—A European Journal* 2005, 11 (2), 440-452.
29. Liu, Z., Positive periodic solution for a neutral delay competitive system. *Journal of Mathematical Analysis and Applications* 2004, 293 (1), 181-189.
30. Sun, S.; Jaouen, F.; Dodelet, J.-P., Controlled Growth of Pt Nanowires on Carbon Nanospheres and Their Enhanced Performance as Electrocatalysts in PEM Fuel Cells. *Advanced Materials* 2008, 20 (20), 3900-3904.
31. Davis, R. J.; Derouane, E. G., A non-porous supported-platinum catalyst for aromatization of n-hexane. *Nature* 1991, 349 (6307), 313.
32. Lytle, J. C.; Denny, N. R.; Turgeon, R. T.; Stein, A., Pseudomorphic transformation of inverse opal tungsten oxide to tungsten carbide. *Advanced Materials* 2007, 19 (21), 3682-+.
33. F. Zhao, F. Harnisch, U. Schröder, F. Scholz, P. Bogdanoff and I. Herrmann, *Environmental Science & Technology*, 2006, 40, 5193-5199.
34. A. Contreras, R. Guirado and T. N. Veziroglu, *International Journal of Hydrogen Energy*, 2007, 32, 4635-4640.
35. A. Midilli and I. Dincer, *International Journal of Hydrogen Energy*, 2007, 32, 511-524.
36. W.-F. Chen, K. Sasaki, C. Ma, A. I. Frenkel, N. Marinkovic, J. T. Muckerman, Y. Zhu and R. R. Adzic, *Angewandte Chemie International Edition*, 2012, 51, 6131-6135.
37. D. J. Ham, R. Ganesan and J. S. Lee, *International Journal of Hydrogen Energy*, 2008, 33, 6865-6872.
38. T. F. Jaramillo, J. Bonde, J. Zhang, B.-L. Ooi, K. Andersson, J. Ulstrup and I. Chorkendorff, *The Journal of Physical Chemistry C*, 2008, 112, 17492-17498.
39. Y. Li, H. Wang, L. Xie, Y. Liang, G. Hong and H. Dai, *Journal of the American Chemical Society*, 2011, 133, 7296-7299.
40. H. Vrubel, D. Merki and X. Hu, *Energy & Environmental Science*, 2012, 5, 6136-6144.
41. Z. Wu, B. Fang, A. Bonakdarpour, A. Sun, D. P. Wilkinson and D. Wang, *Applied Catalysis B: Environmental*, 2012, 125, 59-66.
42. Z. Chen, D. Cummins, B. N. Reinecke, E. Clark, M. K. Sunkara and T. F. Jaramillo, *Nano Letters*, 2011, 11, 4168-4175.
43. A. Phuruangrat, D. J. Ham, S. Thongtem and J. S. Lee, *Electrochemistry Communications*, 2009, 11, 1740-1743.

The invention claimed is:

1. A method of synthesizing tungsten carbide nanorods, the method comprising:
mixing tungsten oxide ($WO_3$) nanorods with a carbon source to obtain precursors; and
calcining the precursors to obtain tungsten carbide nanorods, without use of any catalyst,
wherein the carbon source comprises glucose and the mixing comprises forming a mixture of tungsten oxide ($WO_3$) nanorods with the glucose, the method further comprising hydrothermally treating the mixture and evaporating the hydrothermally treated mixture prior to the calcining, or
wherein the carbon source comprises methane and the mixing comprises heating the tungsten oxide ($WO_3$) nanorods in the presence of the methane and hydrogen in a furnace.

2. The method of claim 1, wherein the hydrothermally treating is performed in an autoclave at about 110° C. to 300° C. for about 4 to 12 hours.

3. The method of claim 1, wherein the calcining comprises heating the precursors at about 600° C. to 1000° C. under a flow of gas comprising at least one of: hydrogen and argon for about 1 to 6 hours, wherein the gas comprises hydrogen and argon having a respective volume ratio of 1:3 and wherein the flow of gas is at a rate of about 300 mL/min.

4. The method of claim 1, wherein the molar ratio of tungsten to carbon in the mixture is 0.078.

5. The method of claim 1, wherein the precursors comprise carbon-coated tungsten oxide ($WO_3$) nanorods.

6. A method of synthesizing a catalyst of metal nanostructures supported on tungsten carbide nanorods, the method comprising:
mixing tungsten oxide ($WO_3$) nanorods and a carbon source to obtain precursors;
calcining the precursors to obtain tungsten carbide nanorods, without use of any catalyst; and
depositing metal nanostructures on the tungsten carbide nanorods to form the catalyst,
wherein the metal nanostructures comprise platinum nanoparticles and wherein the depositing comprises:
suspending the tungsten carbide nanorods in ethylene glycol to form a solution;
adding hexachloroplatinic acid to the solution; and
drying a solid in the solution to form the catalyst.

7. The method of claim 6, wherein suspending the tungsten carbide nanorods in ethylene glycol comprises ultrasonic stirring.

8. The method of claim 6, wherein the hexachloroplatinic acid is added dropwise to the solution to reach a concentration of 4.6 mg platinum per milliliter of ethylene glycol.

9. The method of any one of claim 6, further comprising filtering and washing the solid prior to the drying, wherein the drying is performed in a vacuum oven at about 25° C. to 100° C.

10. The method of any one of claim 6, further comprising increasing alkalinity of the solution prior to the drying, wherein increasing alkalinity comprises adding sodium hydroxide to adjust the pH of the solution to above 13.

11. The method of any one of claim 6, further comprising heating the solution to reduce platinum in the solution prior to the drying, wherein the heating is at about 100° C. to 200° C.

12. The method of claim 6, further comprising promoting with a sedimentation promoter adsorption of suspended platinum nanoparticles onto the tungsten carbide nanorods prior to the drying.

13. The method of claim 6, wherein the metal nanostructures comprise at least one selected from the group consisting: of Pd, Ag and Rh.

14. A catalyst of metal nanostructures supported on tungsten carbide nanorods, wherein each metal nanostructure is about 4 nm in average size, and wherein the tungsten carbide nanorods have a mesoporous nanorod structure comprising mesopores among aggregated nanorods.

15. The catalyst of claim 14, wherein the metal nanostructures comprise platinum nanoparticles.

16. The catalyst of claim 15, having a higher electro-catalytic activity for methanol electro-oxidation and having a greater tolerance to carbon monoxide poisoning than a catalyst of platinum nanoparticles on a carbon support.

\* \* \* \* \*